United States Patent
Hiramatsu et al.

(10) Patent No.: US 9,235,790 B2
(45) Date of Patent: Jan. 12, 2016

(54) IMAGE INSPECTING SYSTEM AND RECORDING MATERIAL PROCESSING DEVICE

(71) Applicant: FUJI XEROX CO., LTD., Tokyo (JP)

(72) Inventors: Takashi Hiramatsu, Kanagawa (JP); Kiyofumi Aikawa, Kanagawa (JP); Kazuya Fukunaga, Kanagawa (JP); Michio Kikuchi, Kanagawa (JP); Natsumi Miyazawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/055,086

(22) Filed: Oct. 16, 2013

(65) Prior Publication Data
US 2014/0285853 A1 Sep. 25, 2014

(30) Foreign Application Priority Data

Mar. 25, 2013 (JP) ................................. 2013-062790

(51) Int. Cl.
*G06K 15/00* (2006.01)
*G06K 15/02* (2006.01)
*H04N 1/00* (2006.01)
*G03G 15/00* (2006.01)

(52) U.S. Cl.
CPC ........ *G06K 15/1872* (2013.01); *G03G 15/5062* (2013.01); *H04N 1/00084* (2013.01); *H04N 1/00641* (2013.01); *H04N 1/00002* (2013.01); *H04N 1/0057* (2013.01); *H04N 1/00082* (2013.01); *H04N 1/00631* (2013.01)

(58) Field of Classification Search
USPC .................................. 358/527, 537; 382/112
See application file for complete search history.

(56) References Cited

U.S. PATENT DOCUMENTS

| | | | | |
|---|---|---|---|---|
| 4,327,993 A | * | 5/1982 | Gauronski | ......... G03G 15/5012 355/77 |
| 6,661,978 B2 | * | 12/2003 | Brewington | .................... 399/19 |
| 6,865,354 B2 | * | 3/2005 | Jackelen et al. | ................ 399/81 |

(Continued)

FOREIGN PATENT DOCUMENTS

| | | |
|---|---|---|
| JP | S62-60756 A | 3/1987 |
| JP | H04-345466 A | 12/1992 |

(Continued)

OTHER PUBLICATIONS

Office Action issued in Australian Patent Application No. 2013254951 dated May 19, 2014.

(Continued)

*Primary Examiner* — Richard Zhu
(74) *Attorney, Agent, or Firm* — Oliff PLC (57) ABSTRACT

A recording material processing device, includes: an accumulation unit that is accumulated with a plurality of recording materials each of which is a recording material formed with an image by an image forming unit and inspected by an inspection unit, where the image forming unit that forms the image on the recording material based on original image data; and a processing unit that removes the recording material which was determined to have a defect which occurred in the image by the inspecting unit, among the plurality of recording materials and adds a new recording material on which a same image is formed by the image forming unit, to the plurality of recording materials, the same image being based on the original image data of the image formed on the defective recording material.

14 Claims, 8 Drawing Sheets

(56) References Cited

U.S. PATENT DOCUMENTS

| | | | |
|---|---|---|---|
| 7,969,613 B2 * | 6/2011 | Honeck et al. | 358/1.9 |
| 8,077,358 B2 * | 12/2011 | Banton et al. | 358/3.24 |
| 8,205,868 B2 * | 6/2012 | Kubota | 270/58.32 |
| 8,351,061 B2 * | 1/2013 | Lee | 358/1.15 |
| 8,448,932 B2 * | 5/2013 | Kubota | G03G 15/5029 270/58.04 |
| 8,953,179 B2 * | 2/2015 | Sawano | B41J 29/38 358/1.12 |
| 2009/0274342 A1 * | 11/2009 | Wu et al. | 382/112 |
| 2011/0075193 A1 * | 3/2011 | Kumamoto et al. | 358/1.15 |
| 2012/0182566 A1 * | 7/2012 | Sawano | 358/1.12 |
| 2013/0164000 A1 * | 6/2013 | Nemoto | G03G 15/553 399/16 |

FOREIGN PATENT DOCUMENTS

| | | |
|---|---|---|
| JP | H08-145910 A | 6/1996 |
| JP | H11-157734 A | 6/1999 |
| JP | 2004-338308 A | 12/2004 |
| JP | A-2011-177980 | 9/2011 |

OTHER PUBLICATIONS

Jun. 30, 2015 Office Action issued in Japanese Patent Application No. 2013-062790.

\* cited by examiner

IMAGE INSPECTING SYSTEM AND RECORDING MATERIAL PROCESSING DEVICE

CROSS-REFERENCE TO RELATED APPLICATIONS

This application is based on and claims priority under 35 U.S.C. 119 from Japanese Patent Application No. 2013-062790 filed on Mar. 25, 2013.

BACKGROUND

Technical Field

The present invention relates to an image inspecting system and a recording material processing device.

SUMMARY

According to an aspect of the invention, an image inspecting system, includes: an image forming unit that forms an image on a recording material based on original image data; an inspecting unit that inspects whether or not a defect occurs in the image formed on the recording material by the image forming unit; an accumulation unit in which a recording material inspected by the inspecting unit is accumulated so that a plurality of recording materials are accumulated; and a processing unit that removes the recording material which was determined to have the defect by the inspecting unit, among the plurality of recording materials, controls the image forming unit to form a same image on a new recording material, the same image being based on the original image data of the image formed on the defective recording material and adds the recording material on which the same image is formed by the image forming unit, to the plurality of recording materials.

DETAILED DESCRIPTION

Hereinafter, an exemplary embodiment of the present invention will be described with reference to the accompanied drawings.

Figure 1:
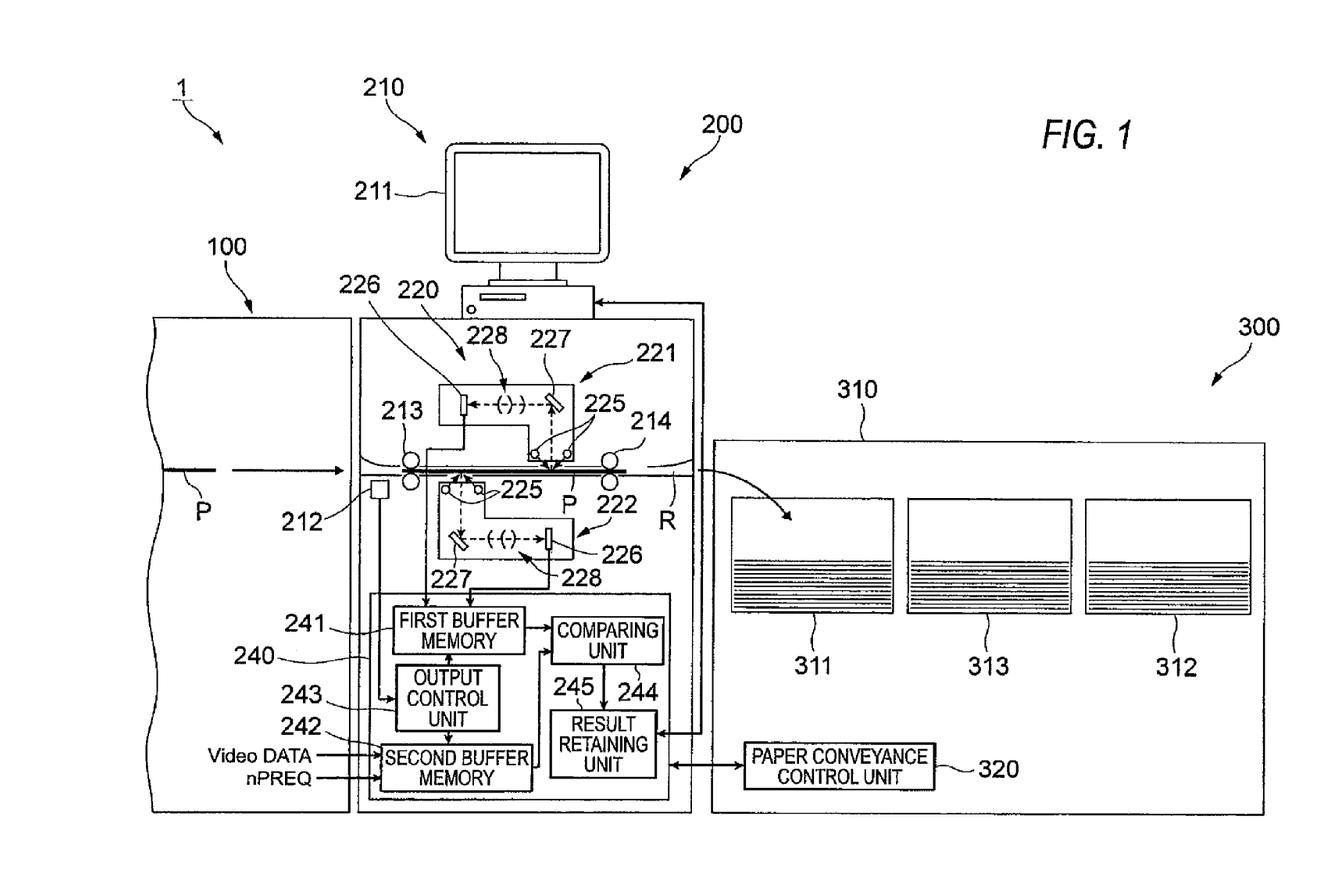
FIG. 1 is a view illustrating overall configuration of an image forming system according to an exemplary embodiment.

FIG. 1 is a diagram illustrating overall configuration of an image forming system according to an exemplary embodiment.

An image forming system 1 according to the exemplary embodiment includes an image forming device 100 which forms an image on a paper P which is an example of a recording material, an inspection device 200 which inspects the image formed on the paper P by the image forming device 100, and a paper accommodation device 300 which receives the paper P ejected from the inspection device 200. Here, since the image forming system 1 according to the exemplary embodiment has a function of inspecting the image formed on the paper P, the image forming system 1 may also be understood as an image inspecting system.

The image forming device 100 as an example of an image forming means obtains image data (hereinafter, referred to as "original image data"), which is a base of an image to be formed, from a PC (personal computer) which is not illustrated and forms an image on the paper P using an image forming material such as a toner, based on the obtained original image data. Further, in the exemplary embodiment, a mechanism which forms the image on the paper P is not especially limited and various methods of the related art such as a so-called electrophotographic method or an inkjet method may be used.

A terminal device 210 is provided in the inspection device 200. The terminal device 210 includes a touch panel type monitor 211 so as to receive an operation from a user (operator) and display information to the user. Further, the inspection device 200 is formed with a paper conveyance path R through which the paper P discharged from the image forming device 100 is conveyed. In addition, the inspection device 200 is provided with an edge detecting sensor 212 which is provided next to the paper conveyance path R to detect an edge of a leading end of the paper P and a first feed roller 213 which delivers the paper P which passes through the edge detecting sensor 212 to a further downstream side.

Further, the inspection device 200 is provided with a second feed roller 214 which is provided at a further downstream side than the first feed roller 213 in a conveyance direction of the paper P to deliver the paper P to the further downstream side. In addition, at a downstream side of the first feed roller 213 and at an upstream side of the second feed roller 214, an image reading device 220 which reads the image formed on the paper P is provided. The inspection device 200 also includes an inspecting unit 240 which inspects the image formed on the paper P based on the image data obtained by the image reading device 220.

The image reading device 220 is provided with a front surface image reading device 221 which is disposed at a side of the image conveyance path R (above the paper conveyance path R in the drawing) to read an image formed on the front surface of the paper P and a rear surface image reading device 222 which is disposed at the other side of the image conveyance path R (below the paper conveyance path R in the drawing) to read an image formed on the rear surface of the paper P.

Here, each of the front surface image reading device 221 and the rear surface image reading device 222 is provided with a light source 225 which irradiates light onto the paper P, a line sensor 226 which receives light reflected from the paper P with a plurality of light receiving elements to generate image data (hereinafter, referred to as "read image data"), and a reflecting mirror which guides the light reflected from the paper P into the line sensor 226. Each image reading device further is provided with an image optical system 228 which focuses the light reflected from the paper P guided by the reflecting mirror 227 onto the line sensor 226.

Next, the inspecting unit 240 will be described. The inspecting unit 240 is provided with a first buffer memory 241 which stores read image data output from the front surface image reading device 221 and the rear surface image reading device 222. In addition, the inspecting unit 240 is provided with a second buffer memory 242 which stores original image data transmitted from the image forming device 100 or the PC (not illustrated). Further, the inspecting unit 240 includes an output control unit 243 which controls the output of the image data (the original image data or the read image data) from the first buffer memory 241 and the second buffer memory 242 to a comparing unit 244.

Here, an output control unit 243 controls the output of the image data from the first buffer memory 241 and the second buffer memory 242 in such a that the output timing of the read image data, which is stored in the first buffer memory 241, from the first buffer memory 241 and the output timing of the original image data, which is stored in the second buffer memory 242, from the second buffer memory 242 become equal to each other.

More specifically, the output control unit 243 sequentially outputs the original image data and the read image data of one page volume (one paper volume) from the first buffer memory 241 and the second buffer memory 242. At this time (when starting outputting of the image data of each page), for example, image data corresponding to an image which is formed at the lead of each page begins to be output, and image data corresponding to an image which is formed at a tail end of each page is finally output.

Further, in the exemplary embodiment, the output starting timing of the read image data from the first buffer memory 241 and the output starting timing of the original image data from the second buffer memory 242 match each other. Simultaneously, even when the image data corresponding to an image which is formed at the rear edge of the page is output, an output timing of the read image data and an output starting timing of the original image data are matched each other. Accordingly, in the present exemplary embodiment, when the original image data is compared with the read image data in the comparing unit 244, a position on the paper P of an image which is specified by the original image data matches a position on the paper P of an image which is specified by the read image data.

More particularly, in the present exemplary embodiment, the output of the edge detecting sensor 212 is output to the output control unit 243 and the output control unit 243 grasps the arrival of the leading edge of the paper P at the edge detecting sensor 212. In addition, to the first buffer memory 241, a clock signal which is synchronized with the image reading is transmitted together with the read image data from the front surface image reading device 221 and the rear surface image reading device 222. Furthermore, to the second buffer memory 242, a page synchronizing signal is transmitted together with the original image data. The output control unit 243 determines the timing of outputting the original image data and the read image data based on the output from the edge detecting sensor 212, the clock signal, and the page synchronizing signal.

The inspecting unit 240 will be described in detail. The inspecting unit 240 is provided with the comparing unit 244 which compares the read image data output from the first buffer memory 241 with the original image data output from the second buffer memory 242. Further, a result retaining unit 245 which retains the comparison result by the comparing unit 244 is also provided.

In addition, the comparing unit 244 divides the read image data sent from the first buffer memory 241 and the original image data sent from the second buffer memory 242 into predetermined regions and performs a pattern matching processing for each region to determine whether a defect occurs in the formed image. In other words, the comparing unit 244 determines whether the image formed on the paper P is formed in accordance with a predetermined condition based on the read image data sent from the first buffer memory 241 and the original image data sent from the second buffer memory 242.

Meanwhile, as a typical pattern matching method, for example, predetermined parameters such as concentration values for a plurality of pixels included in each of two regions which are comparison objects are compared and a difference value between two parameters is calculated. The sum of absolute values of a plurality of difference values obtained from the comparison of the pixels is calculated and then it is determined whether the sum of the absolute values exceeds a predetermined threshold value. If the sum of the absolute values exceeds the predetermined threshold value, it is determined that a defect occurs in (a part of) the image.

Meanwhile, the inspecting unit 240 is configured, for example, by a CPU (central processing unit) which performs an arithmetic processing, a non-volatile ROM (read only memory) or an HDD (hard disk drive) in which a control program is stored, and an RAM (random access memory) which temporarily stores data. Here, the inspecting unit 240, for example, executes the control program stored in the ROM to serve as the output control unit 243 and the comparing unit 244. Further, the first buffer memory 241, the second buffer memory 242, and the result retaining unit 245 are implemented by the RAM or the HDD.

Next, the paper accommodation device 300 will be described.

The paper accommodation device 300 of the present exemplary embodiment as an example of a recording material processing device is provided with a case 310. In addition, inside the case 310, a primary (temporary) storing stacker 311 in which a paper P completely inspected by the inspection device 200 is temporarily stored (stored), a non-defective product stacker 312 in which a paper P which was determined to have no defect which occurred thereon by the user (hereinafter, referred to as a "non-defective paper P") is loaded and a defective product stacker 313 in which a paper P which was determined to have a defect which occurred in the image by the user (hereinafter, referred to as a "defective paper P") is loaded are provided.

Although not illustrated, the paper accommodation device 300 of the present embodiment includes a paper conveyance path which is used to convey the paper P to the primary storing stacker 311, the non-defective product stacker 312, and the defective product stacker 313, a conveyance roller which is provided on the paper conveyance path to convey the paper P, and a delivery roller which delivers the paper P received in the primary storing stacker 311 to the defective product stacker 313 which is an example of a first conveyance destination and the non-defective product stacker 312 which is an example of a second conveyance destination. In addition, the paper accommodation device 300 is provided with a paper conveyance control unit 320 which is configured by a program controlled CPU (central processing unit) to control the conveyance of the paper P in the paper accommodation device 300. Meanwhile, the paper conveyance control unit 320 receives and transmits a control signal from and to the inspecting unit 240.

Figure 2:
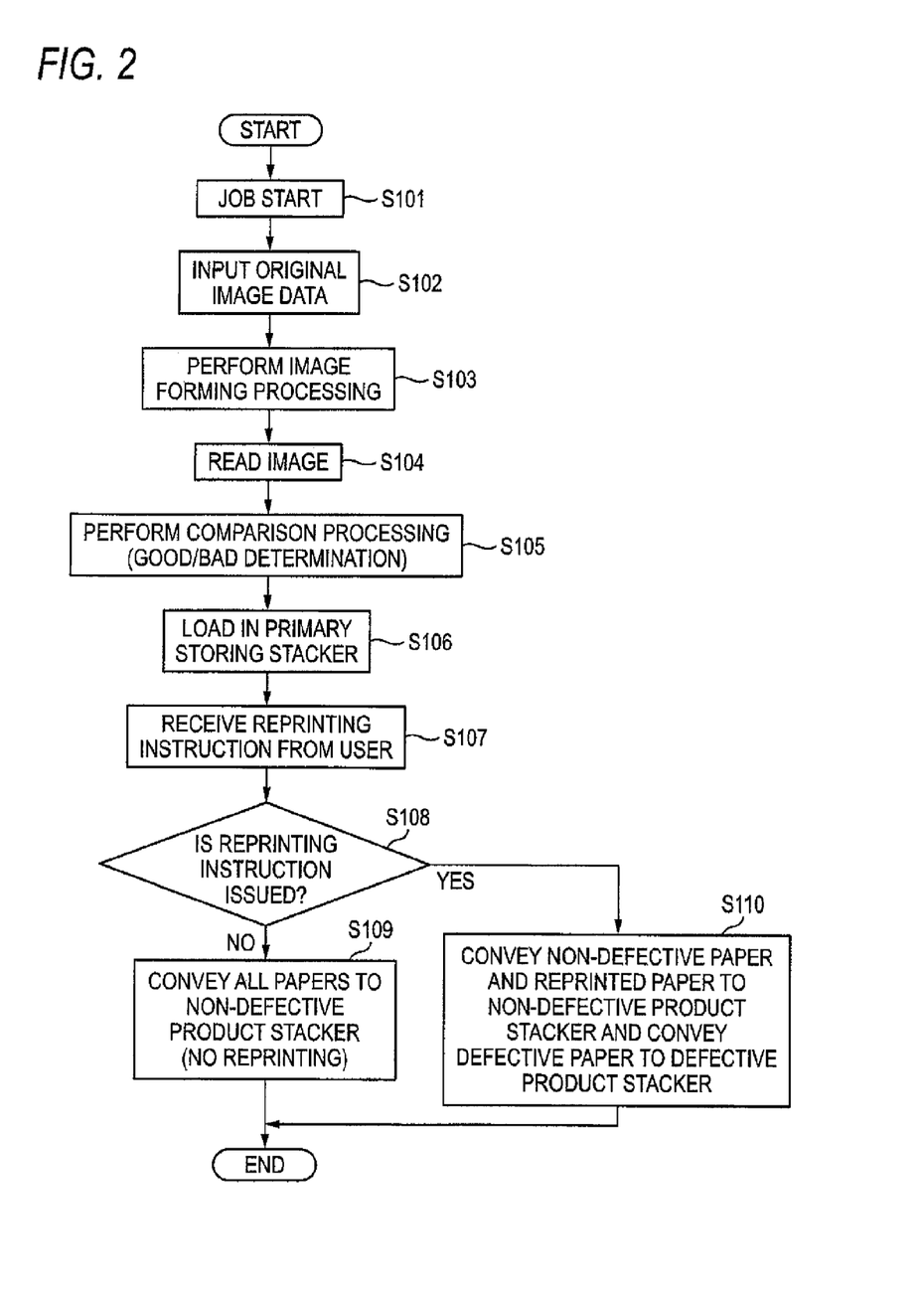
FIG. 2 is a flowchart illustrating a flow of a processing which is performed in the image forming system according to the exemplary embodiment.

FIG. 2 is a flowchart illustrating a flow of a process which is performed in the image forming system 1 according to the present exemplary embodiment.

In the present exemplary embodiment, when a start button which is not illustrated is pressed by the user, an image forming processing (print processing) based on a printing job starts in step 101. Specifically, first, in step 102, original image data provided from the user is input to the image forming device 100 and in step 103, the image forming processing in the image forming device 100 is performed. Meanwhile, the original image data provided from the user is also stored in the second buffer memory 242 of the inspection device 200 (see FIG. 1) to be used for a comparison processing which will be described below.

Then, the papers P which are sequentially discharged from the image forming device 100 by the image forming processing are sent to the inspection device 200 so that the image on the paper P is read by the inspection device 200 in step 104. Further, the read image data obtained by the reading processing is stored in the first buffer memory 241 illustrated in FIG. 1.

Then, in the present exemplary embodiment, the comparing unit 244 of the inspection device 200 performs the comparison processing so as to make a good/bad determination for the image formed on the paper in step 105. Specifically, the read image data stored in the first buffer memory 241 and the original image data stored in the second buffer memory 242 are used to perform a pattern matching processing.

Then, in the present exemplary embodiment, the paper P which is completely inspected by the inspection device 200 is loaded in the primary storing stacker 311 which is provided in the paper accommodation device 300 in step 106. In addition, in the present exemplary embodiment, the paper P which is completely inspected by the inspection device 200 is stored in the primary storing stacker 311 which serves as a storing unit.

Next, in the present exemplary embodiment, an image which is determined to have a defect in a comparison processing in step 105 is displayed on a monitor 211 (see FIG. 1) for every page so that the user may confirm the defect by seeing the image with eyes of the user (the user confirms the defect by seeing the monitor 211 with his/her eyes). Further, in the present exemplary embodiment, when the image is displayed on the monitor 211, other portions than a portion having a defect in the image is not displayed. In this case, information such as personal information hardly leaks out.

In addition, the confirmation with eyes of the user is performed after performing all printing jobs starting in step 101 and completing all printing based on the printing jobs. In other words, in the present exemplary embodiment, all the printed matters formed based on the printing jobs starting in step 101 are loaded on the primary storing stacker 311 and then the user confirms the printed matters with his/her eyes.

In the present exemplary embodiment, when the user starts confirming the printed matter with his/her eyes, a good/bad determination for an image formed on the paper P is made for every page, by the user. For a page formed with an image which was determined to have an image which occurred therein by the user, a reprint instruction may be issued from the user. In this embodiment, "reprint" means to form a same image, the same image being based on the original image data of the image formed on the defective paper P.

In the present embodiment, a reprint command is received through the monitor 211 in step 107 and the reprint command information and the page information on a page to which the reprint command is issued (information indicating a position in the paper bundle in the primary storing stacker 311 of the paper P to which the reprint command is issued) are associated with each other to be retained by the result retaining unit 245. Accordingly, when information retained by the result retaining unit 245 is referred to, it may be confirmed which a paper P of the papers P loaded in the primary storing stacker 311 is reprinted (it may be confirmed whether the paper P is a paper P transferred to the defective product stacker 313).

Then, in the present exemplary embodiment, when all the defective papers P which are loaded in the primary storing stacker 311 are completely determined by the confirmation with the eyes of the user, the paper conveyance control unit 320 which serves as a part of a processing means determines whether the user issues the reprint command in step 108.

In step 108, when it is determined that no reprint command is issued, the paper conveyance control unit 320 conveys all the papers P loaded in the primary storing stacker 311 to the non-defective product stacker 312 (see FIG. 1) in step 109.

Meanwhile, in step 108, when it is determined that the reprint command is issued, the paper conveyance control unit 320 conveys a non-defective paper P among the papers P loaded in the primary storing stacker 311 (a paper P which is determined as a non-defective paper P by the inspection device 200 and a paper P which is determined as a defective paper P by the inspection device 200 but is determined as a non-defective paper P by the user) to the non-defective product stacker 312 in step 110.

Further, in step 110, the paper conveyance control unit 320 conveys a defective paper P among the papers P loaded in the primary storing stacker 311 (a paper P which is determined as a defective paper P by the inspection device 200 and also determined as a defective paper P by the user) to the defective product stacker 313.

In addition, in the processing of step 110, the paper conveyance control unit 320 controls the image forming device 100 to reprint. Then, the image forming device 100 (see FIG. 1) reprints the image, which is formed on the defective paper P, on a new paper P and a paper P (hereinafter, referred to as a "reprinted paper P") on which reprinting is performed is conveyed to the non-defective product stacker 312. In other words, an image is formed on a new paper P based on the original image data corresponding to the image formed on the defective paper P and the reprinted paper P which is formed by the image forming is conveyed to the non-defective product stacker 312. Therefore, the paper bundle in which the defective paper P is removed and the reprinted paper P is added is loaded in the non-defective product stacker 312.

Here, even an image, when it was determined to have a defect which occurred therein though the inspection device 200, it may be determined that no defect occurred when it is determined by a human. In this case, when the papers which are determined as the defective papers by the inspection device 200 are collectively discarded, resource waste may be caused. In the configuration of the present exemplary embodiment, even a paper P which is determined as a paper in which a defect occurs though the inspection device 200, the paper may be subsequently determined as a non-defective paper P and used by the user in some cases. As a result, the resource may be efficiently used.

Meanwhile, it is preferable that the defective papers P loaded in the defective product stacker 313 are cut, for example, in the case 310 (see FIG. 1) so that the defective papers P whose contents may be noticeable may not be carried out to the outside. In addition, it is also preferable that the case 310 is locked with a key so that the defective product stacker 313 may not be brought out. Also, a paper shredder may be mounted in the defective product stacker 313. Furthermore, the non-defective product stacker 312 may be conveyed in a state in which a key is locked.

Figure 3:
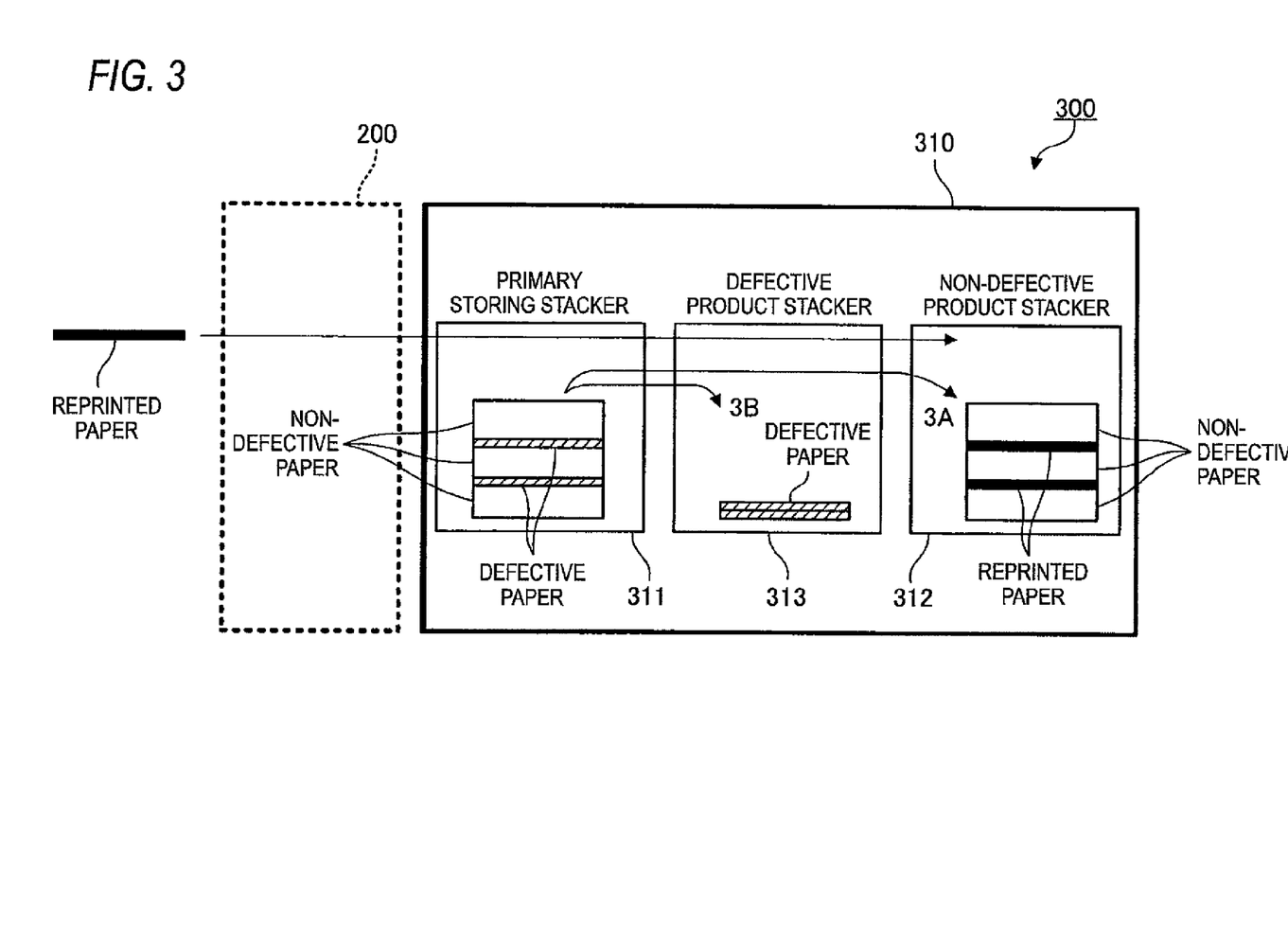
FIG. 3 is a view for describing a processing which is performed in step 110.

FIG. 3 is a view for describing a processing performed in step 110. Meanwhile, the paper conveyance control unit 320 illustrated in FIG. 1 is not illustrated in the drawings following FIG. 3. As described above or as illustrated in FIG. 3, in the present exemplary embodiment, first, the papers P inspected by the inspection device 200 are loaded in the primary storing stacker 311 and a paper bundle is produced in the primary storing stacker 311. Here, in the paper bundle, defective papers P and non-defective papers P are mixed. Thereafter, in the present exemplary embodiment, for each of the defective papers P, a good/bad determination is made by the user and for a paper P which was determined to have a defect which occurred therein, a reprint instruction is issued from the user.

Thereafter, the conveyance of the defective paper P and the non-defective paper P loaded in the primary storing stacker 311 to the non-defective product stacker 312 and the defective product stacker 313 is initiated. Thus, non-defective papers P are accommodated in the non-defective product stacker 312 and defective papers P are accommodated in the defective product stacker 313. More specifically, the non-defective papers P are conveyed from the primary storing stacker 311 to the non-defective product stacker 312 as indicated by arrow 3A in the drawing and accommodated in the non-defective product stacker 312. Further, the defective papers P are conveyed from the primary storing stacker 311 to the defective product stacker 313 as indicated by arrow 3B in the drawing and accommodated in the defective product stacker 313.

Here, when the defective papers P are simply conveyed to the bad quality stacker 313, the number of papers that are being loaded in the non-defective product stacker 312 becomes smaller than a predetermined number. In other words, a paper bundle having a smaller number of papers than the number of printed papers intended by the user is generated in the non-defective product stacker 312. Therefore, in the present exemplary embodiment, the image forming device 100 reprints the image and conveys the reprinted papers P to the non-defective product stacker 312. As a result, a predetermined number of papers P are loaded in the non-defective product stacker 312.

Meanwhile, in the present exemplary embodiment, whenever one defective paper P is conveyed to the defective product stacker 313, the image forming device 100 performs the reprint and whenever one defective paper P is conveyed to the defective product stacker 313, the reprinted paper P is supplied to the non-defective product stacker 312. In this case, a page order of the paper bundle generated in the non-defective product stacker 312 is prevented from becoming different from the original page order.

In addition, for example, the reprinting may be performed after the conveyance of all the papers P from the primary storing stacker 311 to the non-defective product stacker 312 and the defective product stacker 313 has been finished. In addition, for example, the reprinting may be performed before starting the conveyance of the papers P from the primary storing stacker 311 to the non-defective product stacker 312 and the defective product stacker 313. For example, when the papers P are not arranged in the page order (for example, if multiple papers P having the same contents are loaded), the above-processing may be performed.

In addition, the present exemplary embodiment may omit a process of causing the user to confirm the defect by seeing the image with eyes of the user via the monitor 21. For example, regardless of the issue of the reprint command, the paper conveyance control unit 320 may convey the paper P which is determined as the non-defective paper P by the inspection device 200 to the non-defective product stacker 312 and convey the paper P which is determined as the defective paper P by the inspection device 200 to the defective stacker 313. The omitting of the process of user's confirmation increases a processing speed of the image forming system 1.

Although not described above, the reprinted papers P may also be inspected by the inspection device 200. For example, when the inspection device 200 determines that a defect occurs in the reprinted paper P, the conveyance of the reprinted papers P to the non-defective product stacker 312 is stopped so that the reprinted papers are stopped on the paper conveyance path. Therefore, the reprinted papers P which are likely to have a defect occurring therein are prevented from being loaded in the non-defective product stacker 312.

Meanwhile, in this case (even a reprinted paper, when it was determined to have a defect which occurred therein by the inspection device 200), a good/bad determination by the user (a determination made by checking the monitor 211) is requested. When the user determines that no defect has occurred, the reprinted paper P is conveyed to the non-defective product stacker 312. When the user determines that a defect occurred, the reprinted paper P may be conveyed to the defective product stacker 313.

Here, although not described above, it is also considered that whenever the inspection device 200 determines that a defect occurred, the image forming system 1 may perform reprinting. However, in this case, whenever it is determined that a defect occurred, the image forming processing for a normal paper P is stopped. In the case of the processing according to the present exemplary embodiment, the image forming processing on the papers P is continuously performed regardless of the good/bad determination by the inspection device 200 and the reprinting is performed after the image forming processing is finished. When this processing is performed, the decline of the processing efficiency due to the reprinting may be suppressed.

Figure 4:
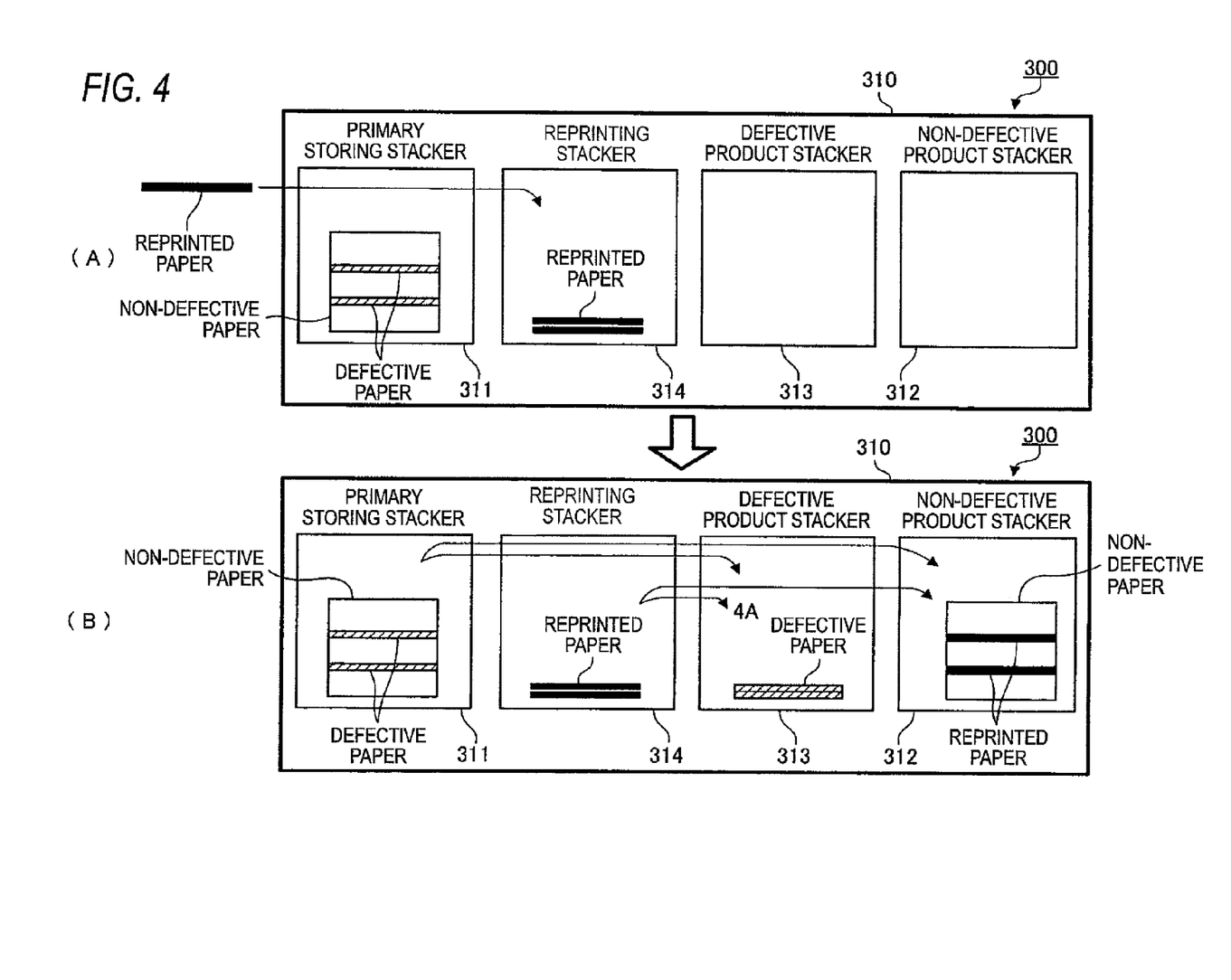
FIG. 4 shows views illustrating another example of a paper loading process in a paper accommodation device.

FIG. 4 shows views illustrating another example of a loading processing of the papers P in a paper accommodation device 300.

The paper accommodation device 300 illustrated in the drawing includes a reprinting stacker 314 in addition to the primary storing stacker 311, the non-defective product stacker 312, and the defective product stacker 313 as illustrated in Part (A) of FIG. 4.

In the paper accommodation device 300, as illustrated in Part (A) of FIG. 4 and also as described above, first, a paper bundle in which the defective papers P and the non-defective papers P are mixed is produced in the primary storing stacker 311. Thereafter, as described above, a good/bad determination by the confirmation with the user's eyes is made and for a defective paper P which was determined as to have a defect which occurred therein, reprinting is conducted. In the present exemplary embodiment, the reprinted paper P obtained by the reprinting is accommodated in the reprinting stacker 314. Thereafter, the conveyance of the non-defective papers P from the primary storing stacker 311 to the non-defective product stacker 312 and the conveyance of the defective papers P from the primary storing stacker 311 to the defective product stacker 313 are initiated.

In this processing, as illustrated in Part (B) of FIG. 4, whenever one defective paper P is conveyed from the primary storing stacker 311 to the defective product stacker 313, one reprinted paper P is conveyed from the reprinting stacker 314 to the non-defective product stacker 312. Accordingly, in the present embodiment, a paper bundle configured by a predetermined number of papers P is produced in the non-defective product stacker 312. Further, in the non-defective product stacker 312, a paper bundle in which a page order is aligned is produced.

Here, in the processing described with reference to FIG. 3, there is a concern that the delivery of the papers P from the primary storing stacker 311 to the non-defective product stacker 312 or the defective product stacker 313 may be stopped whenever reprinting is performed in the image forming device 100. In other words, in the processing described with reference to FIG. 3, there is a concern that whenever reprinting is performed in the image forming device 100, the delivery of the papers P from the primary storing stacker 311 may be stopped. In the meantime, in the present exemplary embodiment, before delivering the papers P from the primary storing stacker 311, reprinting is collectively performed in the image forming device 100 so that a plurality of reprinted papers P are collectively produced. In this case, since the stopping of the delivery may be avoided, the number of papers P which may be processed per unit time may be increased.

Further, when the processing illustrated in FIG. 4 is performed, the convenience of the user when the user makes a good/bad determination for a reprinted paper P is improved.

Here, for example, in the processing illustrated in FIG. 3, when the paper bundle in which papers P are aligned in the page order is loaded in the primary storing stacker 311 and a good/bad determination of the reprinted papers P is made by the user, it is necessary for the user to stand by in front of the monitor 211 (see FIG. 1) and pay attention to the monitor 211 until the primary storing stacker 311 is empty. This is because a reprinting timing is not set in the processing illustrated in FIG. 3. Here, when the user stays apart from the monitor 211, the reprinted papers P may not be conveyed to the downstream side when reprinting is performed. Thus the overall processing may be delayed.

In the meantime, in the processing illustrated in FIG. 4, it is not necessary for the user to stand by in front of the monitor 211, thereby improving the user's convenience. In the processing illustrated in FIG. 4, after the loading of the reprinted papers P to the reprinting stacker 314 is completely finished, the user may make a good/bad determination collectively.

Further, when it was determined by the user that a defect occurred even in a reprinted paper P, the reprinted paper P which was determined to have the defect which occurred therein is conveyed to the defective product stacker 313 as illustrated in the arrow 4A of Part (B) of FIG. 4 and reprinting (second reprinting) is performed again in the image forming device 100 so that a reprinted paper P which is generated by the second reprinting may be conveyed to the non-defective product stacker 312. Meanwhile, the good/bad determination by the user may be made for the reprinted papers P which are produced by the second reprinting.

Figure 5:
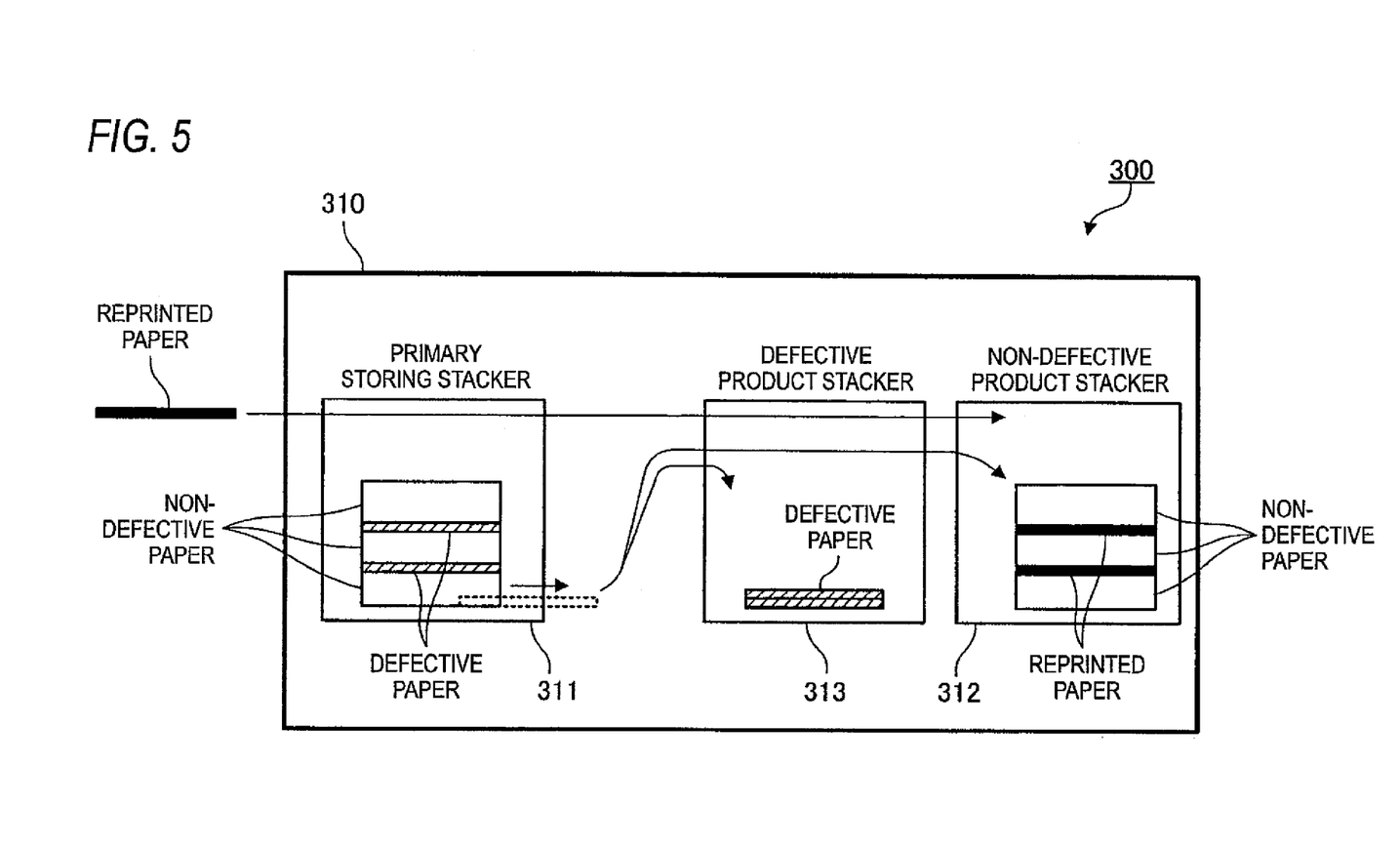
FIG. 5 is a view illustrating another example of the paper loading process in the paper accommodation device.

FIG. 5 is a view illustrating another example of a loading processing of papers P in the paper accommodation device 300.

The paper accommodation device 300 illustrated in the drawing is provided with a primary storing stacker 311, a non-defective product stacker 312, and a defective product stacker 313, as in the configuration illustrated in FIG. 3.

Herein in the processing described with reference to FIG. 3, conveyance is initiated from the uppermost paper P among the papers P loaded in the primary storing stacker 311. However, in the present exemplary embodiment, the conveyance is initiated from the lowermost paper P among the papers P loaded in the primary storing stacker 311. When this processing is performed, the conveyance of the papers P from the primary storing stacker 311 may be initiated without waiting the printing of all the pages included in the printing job.

In other words, in the processing illustrated in FIG. 5, a plurality of papers P are loaded so that a paper bundle is produced in the primary storing stacker 311. Further, when a new paper P is added in the paper bundle, the new paper P is added to overlap with one surface (the top surface in the drawing) of the paper bundle. In the meantime, when the papers P loaded in the primary storing stacker 311 are delivered, the delivery is performed from the other side (the bottom surface side in the drawing) of the paper bundle. In this case, as described above, the conveyance of the paper P from the primary storing stacker 311 may be initiated without waiting the printing of all pages included in the printing job.

Here, in the case of configuration illustrated in FIG. 3, when the conveyance of the paper P from the primary storing stacker 311 is initiated without waiting the printing of all the pages, the pages may be turned upside down. However, like the processing illustrated in FIG. 5, when the conveyance is initiated from the bottom part, the turning of the pages is restricted.

Further, when the defective papers P are conveyed from the primary storing stacker 311, the reprinting is performed as described above. In this case, the reprinted papers P are conveyed to the non-defective product stacker 312 without being conveyed to the primary storing stacker 311. In other words, in the case of the processing of the present exemplary embodiment, reprinting may be performed while the papers P (papers P other than the reprinted papers P) are sequentially received in the primary storing stacker 311. In this case, the reprinted papers P are conveyed to the non-defective product stacker 312 rather than the primary storing stacker 311.

Figure 6:
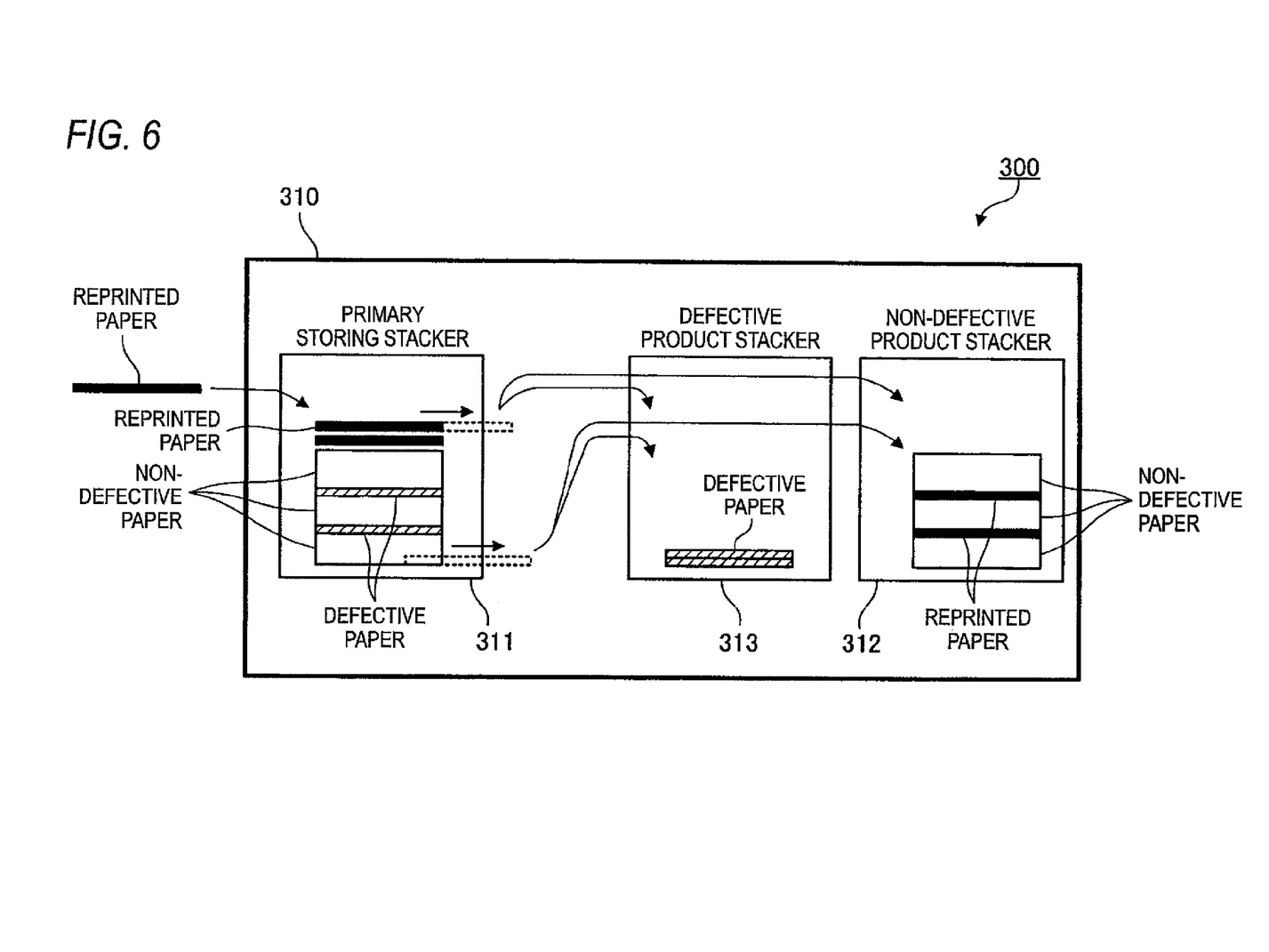
FIG. 6 is a view illustrating another example of the paper loading process in the paper accommodation device.

FIG. 6 is a view illustrating another example of the loading processing of the papers P in the paper accommodation device 300.

The paper accommodation device 300 illustrated in the drawing is provided with a primary storing stacker 311, a non-defective product stacker 312, and a defective product stacker 313.

Here, in this processing, as described above, first, a paper bundle in which the defective papers P and the non-defective papers P are mixed is produced in the primary storing stacker 311. Thereafter, in this processing, as described above, a good/bad determination by the user is made for the papers which were determined as defective papers P by the inspection device 200. Thereafter, in this process, reprinting is performed for the papers determined as the defective paper by the user and the reprinted papers P are loaded in the primary storing stacker 311 as illustrated in FIG. 6.

Thereafter, in this processing, conveyance is initiated from the lowermost paper P among the papers P loaded in the primary storing stacker 311. Here, the non-defective papers P are conveyed to the non-defective product stacker 312 as described above. In addition, the defective papers P are conveyed to the defective product stacker 313. When the defective papers P are conveyed to the defective product stacker 313, a reprinted paper P corresponding to a defective paper P is extracted from the uppermost paper among the papers P loaded in the primary storing stacker 311 and conveyed to the non-defective product stacker 312. Accordingly, also in this processing, a paper bundle from which the defective papers P are removed and to which the reprinted papers P are received is produced on the non-defective product stacker 312.

As described above, in the processing described with reference to FIG. 3, there is a concern that the conveyance of the paper P from the primary storing stacker 311 to the non-defective product stacker 312 or the defective product stacker 313 may be stopped whenever reprinting is performed. However, in the present exemplary embodiment, the stopping of conveyance is avoided so that the number of papers P processed per unit time may be increased.

In addition, in the processing of the present exemplary embodiment, an occupying volume of the device is reduced. As in the processing of the present exemplary embodiment, in the processing illustrated with reference to FIGS. 4A and 4B, the reprinted papers P are collectively printed and the reprinted papers P are accommodated using the reprinting stacker 314 in the processing illustrated with reference to FIGS. 4A and 4B. However, in such a case, the occupying volume of the device is increased by the volume of the reprinting stacker 314. In the processing of the present exemplary embodiment, since the reprinting stacker 314 becomes unnecessary, the occupying volume of the device may be reduced as compared with the configuration as illustrated in FIGS. 4A and 4B.

In addition, as in the processing illustrated with reference to FIGS. 4A and 4B, in the processing of the present exemplary embodiment, the user's convenience when the user makes a good/bad determination for the reprinted papers P may be improved. As described above, in the processing of the present exemplary embodiment, the user may make a good/bad determination for the reprinted papers P collectively.

Figure 7:
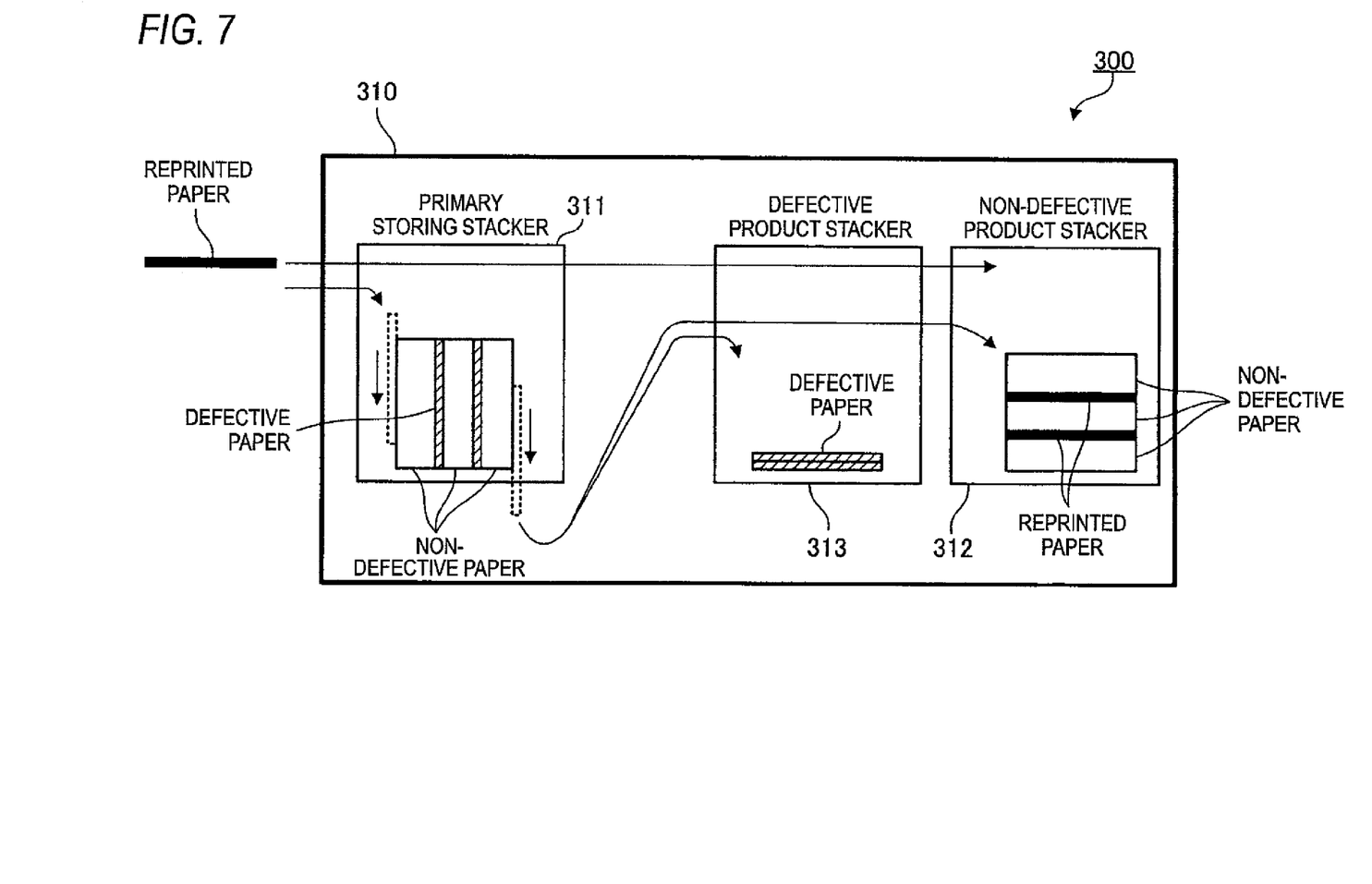
FIG. 7 is a view illustrating a paper loading status in a primary storing stacker.

Meanwhile, in the primary storing stacker 311, as illustrated in FIG. 7 (which is a view illustrating a status in which the papers P are loaded in the primary storing stacker 311), the papers P may be stored such that a plane direction of the papers is arranged along the vertical direction. In other words, the papers P each of which is formed as a sheet shape may be stored to be disposed along the vertical direction. Here, in the processing illustrated in FIGS. 5 and 6, the papers P are loaded from the top portion in the primary storing stacker 311 and the papers P is delivered from the bottom portion. However, in this case, since the weight of the paper bundle is applied to the paper P which is located at the bottom portion, it may be difficult to extract the paper P. In the present exemplary embodiment, the load applied to the paper P to be extracted is reduced so that the paper P may be easily extracted.

However, as described above, when the papers P are loaded in the primary storing stacker 311, the non-defective papers P and the defective papers P are loaded in the non-defective product stacker 312 and the defective product stacker 313, respectively, and the reprinted papers P are conveyed to the non-defective product stacker 312, the pages may be easily changed as compared with the ease in which the papers P are simply loaded in one place.

Figure 8:
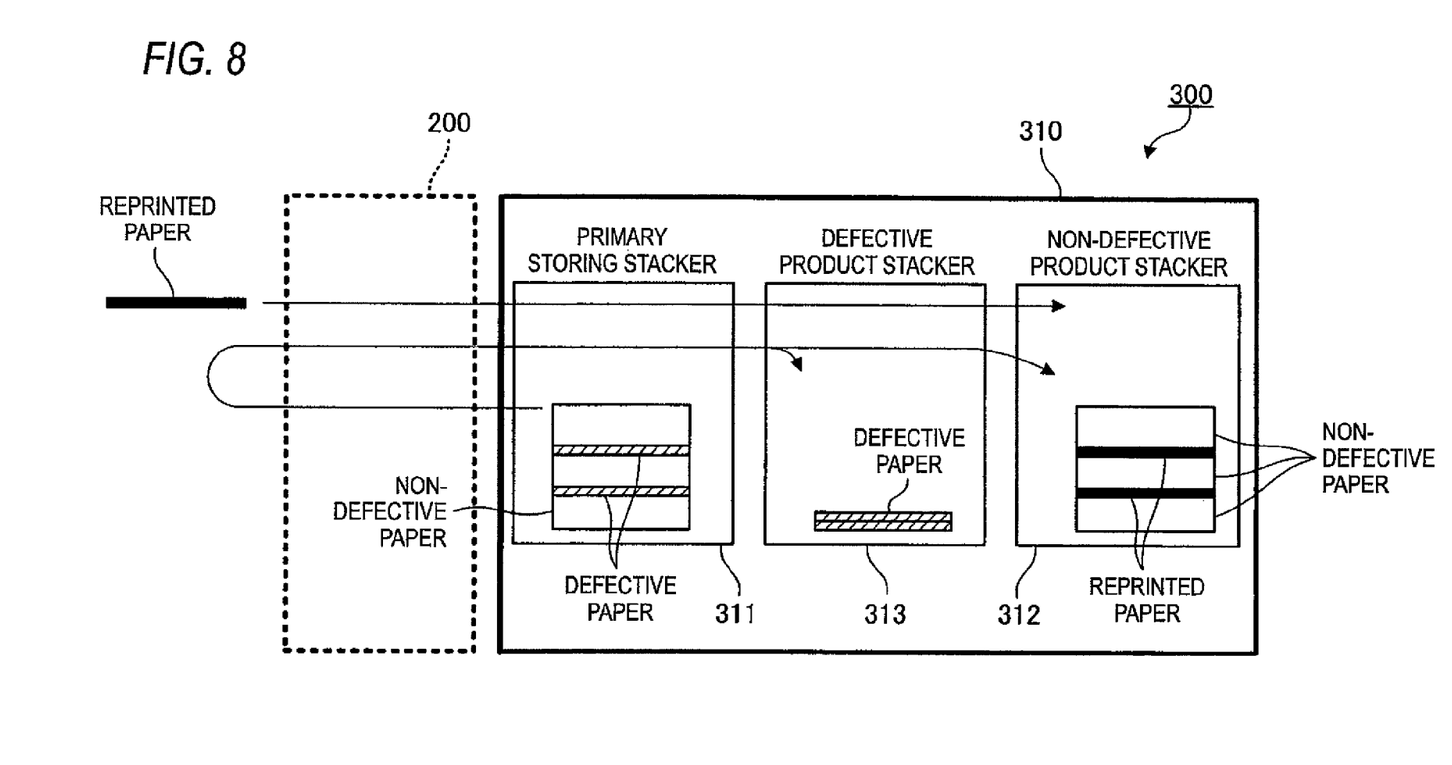
FIG. 8 is a view illustrating an example of a paper conveyance processing.

Therefore, as illustrated in FIG. 8 (which is a view illustrating an example of a paper conveyance processing), when the papers P loaded in the primary storing stacker 311 are conveyed to the non-defective product stacker 312 and the defective product stacker 313, the inspection device may inspect the papers P. Further, when the reprinted papers P are conveyed to the non-defective product stacker 312, the inspection device may inspect the reprinted papers P. In other words, in this processing, when the papers loaded in the primary storing stacker 311 are conveyed to the non-defective product stacker 312 and the defective product stacker 313, the papers pass through the inspection device 200 again.

As a result, it is possible to check, for example, whether the pages are switched. Meanwhile, it is also possible to cause only non-defective paper P among the paper P loaded in the primary storing stacker 311 to pass through the inspection device 200 and to cause the defective paper P not to pass through the inspection device 200.

Further, although not described above, as in the processings illustrated in FIGS. 3, 4A, 4B and 8, if the papers P are loaded on the primary storing stacker 311, the papers P loaded in the primary storing stacker 311 are extracted from the top side, and the papers P loaded in the primary storing stacker 311 in the page order, the page order is changed when the papers S are loaded in the good quality stacker 312.

Therefore, for example, a mechanism which reverses a front surface and a rear surface of a paper may be provided in the paper conveyance path which connects the primary storing stacker 311 and the non-defective product stacker 312. Further, for example, the printing may be performed while switching the page order during the step in which an image is formed on the papers P by the image forming device 100. In other words, the image may be formed on the paper P in the reverse order to the original page order.

Further, it has been described above that all the papers printed by one printing job are conveyed to the non-defective product stacker 312 via the primary storing stacker 311. However, until the inspection device 200 determines that a defect occurs, the papers P may be conveyed to the non-defective product stacker 312 without passing through the primary storing stacker 311. When it is determined that a defect occurred, the papers P are loaded in the primary storing stacker 311.

Further, Also in this processing, the papers P are conveyed from the primary storing stacker 311 after the loading of the papers P in the primary storing stacker 311 are finished as in the above-described processings. In this case, the conveyance may be performed from the lowermost paper P among the papers P which are loaded in the primary storing stacker 311. In this case, the papers P are suppressed from being loaded in the non-defective product stacker 312 in an order different from the predetermined order (page order).

It has been described above that the defective papers P are received in the primary storing stacker 311 first. However, the defective papers P may be received in the defective product stacker 311 without passing through the primary storing stacker 311. A paper P which is determined as a non-defective paper P through the good/bad determination by the user is conveyed to the non-defective product stacker 312 from the defective product stacker 313.

Further, when this processing is performed, papers P determined as non-defective papers P by the user are continuously arranged from a first paper (a first paper at the uppermost or the lowermost portion) of the paper bundle located in the defective product stacker 313, the papers P may be conveyed to the non-defective product stacker 312. Meanwhile, if these papers P are located in the middle of the paper bundle, it is difficult to convey the papers P to the non-defective product stacker 312. Further, in this case, the papers may be reprinted by the image forming device 100 so that the reprinted papers P produced by reprinting may be supplied to the non-defective product stacker 312.

Further, it has been described above that the papers P are conveyed from the primary storing stacker 311 to the non-defective product stacker 312 or the defective product stacker 313, the non-defective paper P may be conveyed to a post-processing device which performs a predetermined processing on the paper P rather than conveyed to the non-defective product stacker 312. In addition, an example of the post-processing device may include a device which loads a plurality of non-defective papers P to create a paper bundle to perform a binding processing on the paper bundle. Further, the post-processing device may be a device that cuts, classifies, folds, binds, and inserts the paper bundle into an envelope. Further, although a configuration in which the primary storing stacker 311, the non-defective product stacker 312, and the defective product stacker 313 are arranged in a horizontal direction has been described above, as an example, these stackers may be arranged in a vertical direction. In this case, the occupying area of the paper accommodation device 300 may be reduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image inspecting system, comprising:
    an image forming unit that forms an image on a recording material based on original image data;
    an inspecting unit that inspects whether or not a defect occurs in the image formed on the recording material by the image forming unit;
    a primary stacking unit that stacks all of a plurality of recording materials on which images have been formed by the image forming unit regardless of an inspection result by the inspecting unit; and
    a processing unit that (1) removes, from the primary stacking unit, a defective recording material from the plurality of recording materials stacked in the primary stacking unit, the defective recording material which has been inspected to have the defect by the inspecting unit, (2) controls the image forming unit to form a same image on a new recording material, the same image being based on the original image data of the image formed on the defective recording material and (3) adds the new recording material on which the same image is formed by the image forming unit, to be included in the plurality of recording materials;
    a non-defective product stacking unit that stacks a non-defective recording material conveyed from the primary stacking unit, the non-defective recording material having been inspected not to have the defect by the inspecting unit, and stacks the new recording material; and
    a defective product stacking unit that stacks the defective recording material conveyed from the primary stacking unit.

2. The image inspecting system of claim 1, further comprising:
    a notifying unit that notifies a user of the image of the recording material which has been inspected to have the defect by the inspecting unit; and
    a receiving unit that receives from the user, an instruction regarding whether or not the recording material of the notified image should be removed from the primary stacking unit,
    wherein the processing unit removes a recording material which corresponds to the instruction indicating the recording material of the notified image should be removed as the defective recording material.

3. The recording material processing device of claim 2,
    wherein the processing unit conveys to the non-defective product stacking unit a recording material which corresponds to the instruction indicating that the recording material of the notified image should not be removed as the non-defective recording material.

4. The image inspecting system of claim 1,
    wherein, when there are two or more defective recording materials, the processing unit controls the image forming unit to collectively form the same images on the new recording materials and then adds the new recording materials.

5. The image inspecting system of claim 1,
    wherein the processing unit conveys the non-defective recording material from the primary stacking unit to the non-defective product stacking unit, after the inspecting unit inspects that a page allocated to the non-defective recording material is not switched again.

6. The image inspecting system of claim 1,
    wherein, in response to the defective product stacking unit stacking the defective recording material conveyed from the primary stacking unit, the non-defective product stacking unit stacks the corresponding new recording material on which the same image as the image formed on the defective recording material, conveyed from the primary stacking unit, to keep a page order of the plurality of recording materials stacked in the primary stacking unit.

7. The image inspecting system of claim 1, further comprising:
    a reprinting stacking unit that temporarily stacks the new recording material on which the same image is formed,
    wherein the processing unit conveys the new recording material stacked in the reprinting stacking unit to the non-defective product stacking unit.

8. The image inspecting system of claim 7,
    wherein, response to the defective product stacking unit stacking the defective recording material conveyed from the primary stacking unit, the non-defective product stacking unit stacks the corresponding new recording material on which the same image as the image formed on the defective recording material, conveyed from the reprinting stacking unit, to keep a page order of the plurality of recording materials stacked in the primary stacking unit.

9. A recording material processing device, comprising:
    a primary stacking unit that stacks all of a plurality of recording materials on which images are formed by an image forming unit and inspected by an inspecting unit regardless of an inspection result by the inspecting unit; and
    a processing unit that (1) removes, from the primary stacking unit, a defective recording material from the plurality of recording materials stacked in the primary stacking unit, the defective recording material having been inspected to have a defect which occurred in the image by the inspecting unit and (2) adds a new recording material on which a same image is formed by the image forming unit, to be included in the plurality of recording materials, the same image being based on an original image data of the image formed on the defective recording material;
    a non-defective product stacking unit that stacks a non-defective recording material conveyed from the primary stacking unit, the non-defective recording material having been inspected not to have the defect by the inspecting unit, and stacks the new recording material; and
    a defective product stacking unit that stacks the defective recording material conveyed from the primary stacking unit.

10. The recording material processing device of claim 9,
    wherein the primary stacking unit further stacks the new recording material on a recording material bundle from one surface side of the recording material bundle which is a bundle of all of the plurality of recording materials, the processing unit conveys the new recording materials stacked on the recording material bundle from the one surface side of the recording material bundle and conveys the plurality of recording materials of the recording material bundle from the other surface side of the recording material bundle.

11. The recording material processing device of claim 10, wherein the plurality of recording materials are sheet type, and the plurality of recording materials stacked in the primary stacking unit are arranged along an upward direction.

12. The recording material processing device of claim 9, wherein, in response to the defective product stacking unit stacking the defective recording material conveyed from the primary stacking unit, the non-defective product stacking unit stacks the corresponding new recording material on which the same image as the image formed on the defective recording material, conveyed from the primary stacking unit, to keep a page order of the plurality of the recording materials stacked in the primary stacking unit.

13. The recording material processing device of claim 9, further comprising:

a reprinting stacking unit that temporarily stacks the new recording material on which the same image is formed, wherein the processing unit conveys the new recording material stacked in the reprinting stacking unit to the non-defective product stacking unit.

14. The recording material processing device of claim 13, wherein, in response to the defective product stacking unit stacking the defective recording material conveyed from the primary stacking unit, the non-defective product stacking unit stacks the corresponding new recording material on which the same image as the image formed on the defective recording material, conveyed from the reprinting stacking unit, to keep a page order of the plurality of recording materials stacked in the primary stacking unit.

\* \* \* \* \*